No. 657,649. Patented Sept. 11, 1900.
W. J. DONALDSON, Jr.
VEHICLE AIR BRAKE.
(Application filed Oct. 11, 1897.)
(No Model.) 2 Sheets—Sheet 1.
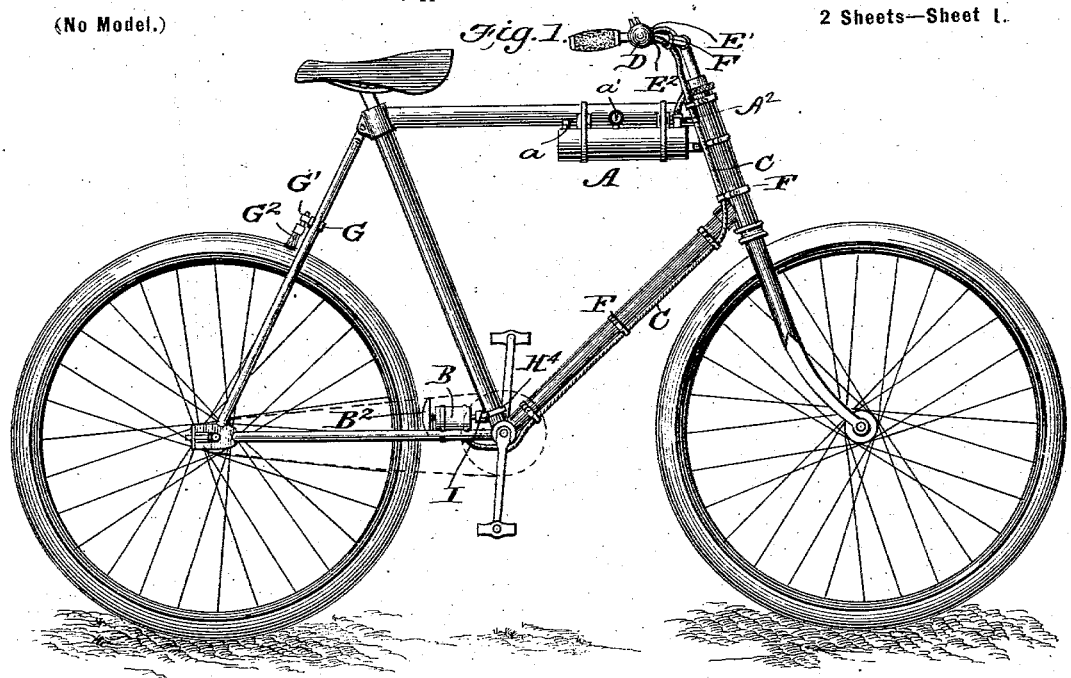
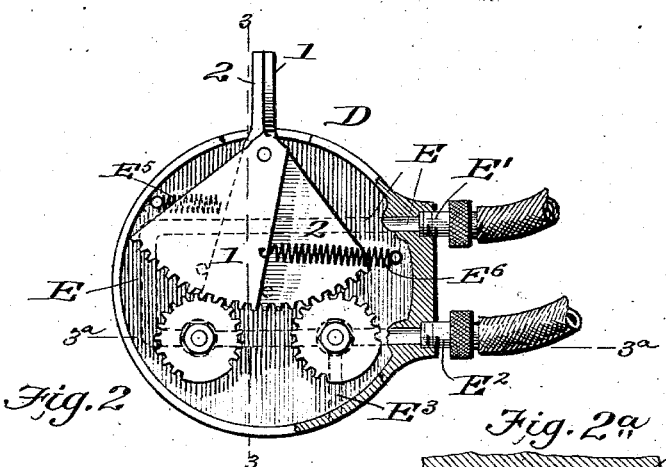
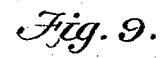
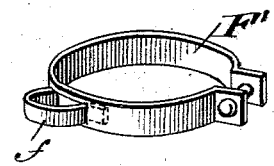
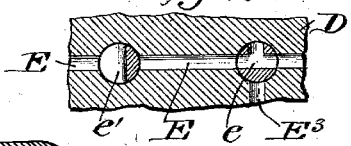
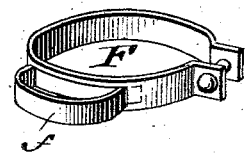
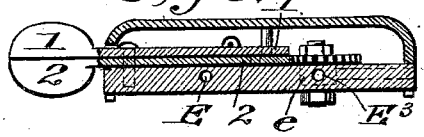
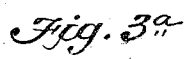
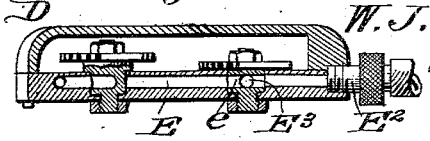
WITNESSES:
INVENTOR
W. J. Donaldson, Jr.
BY Munn & Co.
ATTORNEYS.

No. 657,649. Patented Sept. 11, 1900.
W. J. DONALDSON, Jr.
VEHICLE AIR BRAKE.
(Application filed Oct. 11, 1897.)
(No Model.) 2 Sheets—Sheet 2.
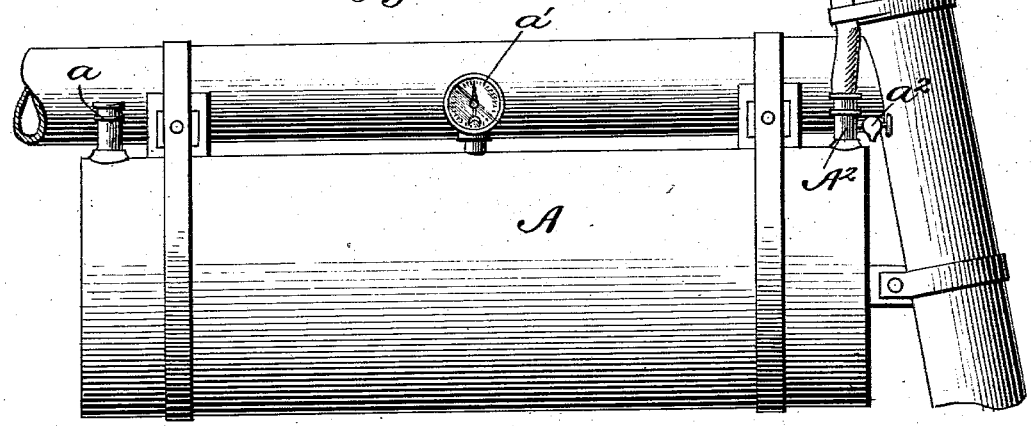
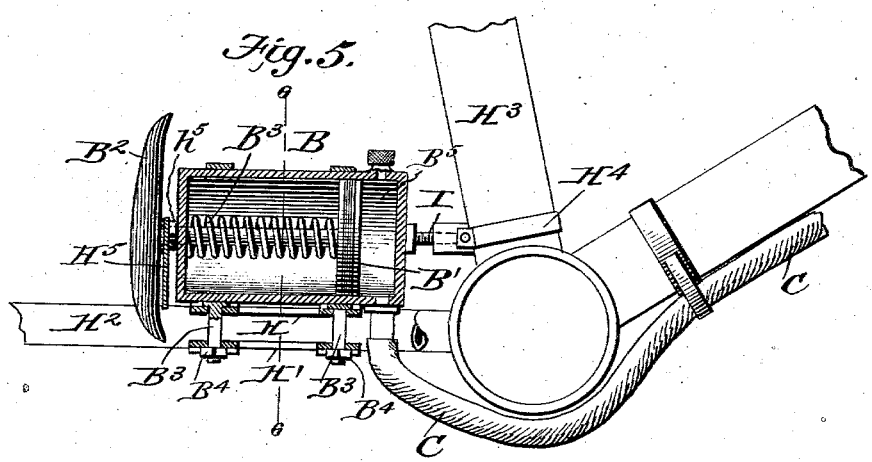
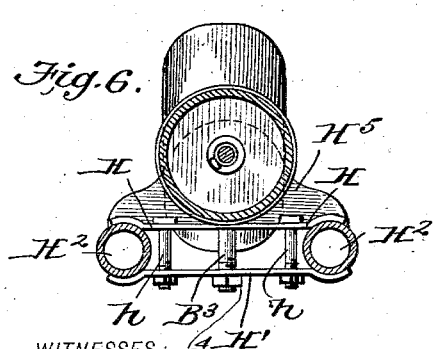
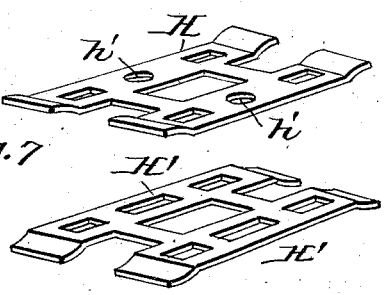
WITNESSES
INVENTOR
W. J. Donaldson, Jr.
BY Munn & Co.
ATTORNEYS.

UNITED STATES PATENT OFFICE.

WILLIAM JOHN DONALDSON, JR., OF LA GRANGE, TEXAS.

VEHICLE AIR-BRAKE.

SPECIFICATION forming part of Letters Patent No. 657,649, dated September 11, 1900.

Application filed October 11, 1897. Serial No. 654,915. (No model.)

*To all whom it may concern:*

Be it known that I, WILLIAM JOHN DONALDSON, Jr., of La Grange, in the county of Fayette and State of Texas, have invented a new and useful Improvement in Vehicle Air-Brakes, of which the following is a plain, simple, and concise specification.

My invention is an improvement in bicycle, tricycle, or other vehicle brakes simple in construction and possessing excellent efficiency, my object being to provide a new and novel, durable, and inexpensive brake with powerful and accurate retard motion and with quick action in setting and releasing the brake, with little or no exertion on the part of the rider, and at the same time present a general handsome appearance.

The invention consists in certain novel constructions and combinations of parts, as will be hereinafter described and claimed.

In the drawings, Figure 1 is a side view of a bicycle with improvement applied. Fig. 2 is a face view, parts being broken away and others shown in section, of the operating-valve. Fig. 2$^a$ is a detail cross-section of operating-valve, showing location and position of valve-plugs. Figs. 3 and 3$^a$ are cross-sections of operating-valves. Fig. 4 is a detailed view of air-receptacle and parts immediately associated therewith. Fig. 5 is a detailed elevation of brake-shoe, piston-bracket, and cylinder and parts immediately associated therewith. Fig. 6 is a cross-section of Fig. 5, showing end of cylinder and piston, traveling bracket, clamps, and stay-bolts. Fig. 7 shows in detail the frame-plates for supporting and holding the cylinder in position. Fig. 8 is a detailed view of clamps for securing the air tubes or pipes to the handle-bars, and Fig. 9 is a detailed view of one of the single-tube clamps shown on turning-post and lower section of wheel-frame.

In carrying out my invention I provide an air-receptacle A, which is the base of air-supply and is in practice well stayed and capable of sustaining the desired air-pressure, usually about twenty-five pounds. This receptacle may be copper, zinc, or other suitable material and may be enameled, nickeled, or otherwise finished and is preferably arranged and supported similarly to the ordinary tool-bag and presents the general appearance of the usual tool-case when applied for use.

In use air is stored in the receptacle A. It may be by the ordinary bicycle hand or foot pump applied to the valve-nipple $a$, the pressure being indicated by the gage $a'$. From this receptacle the air is conducted to and from the cylinder-chamber B by the connecting pipes or tubes and opens into the cylinder B at B$^5$ back of piston B' to operate such piston and set the brake-shoe B$^2$ against the wheel. The brake-shoe and piston are retracted to normal position automatically by the spring B$^3$, and the operation is effected by simply pressing gently on the segment-lever 2, which turns the plug E to register with the vent E$^3$ and allows the air to escape.

Behind the brake-shoe, on end of piston, I secure a traveling bracket H$^5$, which reaches crosswise in front of cylinder from one side of bar-frame $h^2$ to the other and is secured by use of a jam-nut $h^5$ on the piston, so as to slide forward and back on bar H$^2$ with the piston, the object being to prevent the shoe and end of piston from sagging downward by the friction and pressure of the wheel while in motion.

The pipe connection between the receptacle and air cylinder-chamber may be termed the "line-pipe" C, and in its course I provide the operating-valve D. This valve is preferably formed in the shape of an ordinary signal-bell and is clamped to the handle-bar and has formed through it an air-passage E, which receives the air from the reservoir at nipple E' and discharges it at nipple E$^2$ to the pipe which leads to the brake-cylinder air-chamber B. The valve D also has a vent E$^3$ to the atmosphere for the passage of the air in releasing the brake. The passage E is controlled by the valves $e$ and $e'$, which are turned by the upper and lower buttons or levers 1 and 2, which have rack-segments geared with teeth on the plugs, the levers being held in position by coil-springs E$^5$ and E$^6$. The valve-plug $e'$ has a single straight port turning into register with or crosswise of the air-passage E, while the valve-plug $e$ has a two-way port and may be turned into register with the passage E or to discharge the air from the cylinder-chamber through the vent E$^3$ by the pressure of the spring B$^3$. In the operation of this construction, to apply the brake, pressure by the thumb should be applied gently to the button or lever No. 1. This opens the valve and allows the air to pass from the receptacle to the cylinder air-chamber to set the brake. After the brake is partly or fully set, the button or lever 1 should be released and the wheel allowed to remain under the control of the brake. To release the brake, the lower button or lever No. 2 should be gently pressed to adjust the valve-plugs to vent the air to the atmosphere at $E^3$, and the brake-shoe and piston will release automatically.

In connecting the line-pipe C with the receptacle the latter is provided with a nipple $A^2$, having a shut-off cock $a^2$. In securing the line-pipe to the frame of the wheel I employ the clamps F and F', the former having two and the latter a single loop $f$, the clamp F being employed where the line-pipe extends in two lengths, as on the handle-bars, and the clamp F' where but a single length is to be secured.

Just above the rear wheel, on the frame-bars, I support, by means of plates G and eyebolt G', the brush $G^2$, which removes all dirt and other obstructions from the wheel in advance of the brake-shoe, avoiding clogging at the brake-shoe.

In securing the cylinder to the bicycle-frame I provide a set of frame-plates H and H', fitting above and below the frame-bars $H^2$ of the machine and connected together and clamped upon the said frame by stay-bolts $h$. The plates H H' have openings $h'$ for bolts $B^3$ on the cylinder B, such bolts $B^3$ extending through the plates H H' and receiving the nuts $B^4$, by which the cylinder is anchored firmly in position.

On the rear frame-bar $H^3$ of the bicycle I secure by clamp $H^4$ the adjustable back-stop I for the cylinder, such stop consisting of a set-screw which may be readily turned to adjust the cylinder and brake-shoe to the proper relation with the wheel.

It will be noticed that the application of my brake to any of the ordinary bicycles may be readily effected, no change in the machine being necessary, and, further, that when applied it presents no clumsy or unsightly appearance—in fact, is not noticeable to the ordinary observer, most of the parts being fashioned to resemble conventional bicycle attachments.

The advantages experienced in the use of my improvement in bicycles are manifest and include great ease of application, a powerful application of the brake, a quick release thereof, and accurate regulation of the force of the brake, and its operation does not necessitate the removal of the gloves or hand from the handle-bar, the operating-valve D being conveniently located and operated by the thumb by slightly pressing segment-lever No. 1 to set the brake and No. 2 to release it.

It will be understood that I do not confine or limit myself to the precise construction shown, as various modifications and variations may be effected without departing from the main features of my improvement.

Having thus described my invention, what I claim as new, and desire to secure by Letters Patent, is—

1. In a brake substantially as described an operating-valve, provided with an air-passage to and from the cylinder, and the vent-passage to atmosphere, a single and a two way valve-plug in said casing, and having its ports or ways arranged to be turned into register with the passage and vent and means whereby said valve-plugs may be turned, including segment-levers and springs $E^5$ and $E^6$, to control the air-passage, substantially as shown and described.

2. In a brake substantially as described, the combination with the bicycle or vehicle frame, of the brake-shoe piston and cylinder, the frame for supporting said cylinder having upper and lower plates and bolts connecting the same, and clamping them to the bicycle or vehicle frame, and a bracket traveling with the piston whereby to prevent the sagging of the brake-shoe, and piston-rod by the friction of the wheel, substantially as described.

3. The combination of the brake-shoe cylinder a support therefor an abutment and an adjustable back-stop for cylinder consisting of a set-screw bearing between the cylinder and the abutment, substantially as described.

4. In an air-brake, an operating-valve comprising the casing having the air-passage and vent, the plugs turning in said casing and controlling said passage and vent, and the buttons having rack-segments geared with and adapted to operate the plugs substantially as described.

5. The improvement herein described consisting of the air-receptacle, and the brake-cylinder, pipes or tubes for conducting the air and the operating-valve having a casing, an air-passage and a vent, the plugs controlling the said passage and vent and the buttons or levers, and the traveling piston-bracket for preventing the downward motion of the brake-shoe and the piston-rod substantially as described.

6. In a brake apparatus substantially as described, the combination of the brake-shoe, the cylinder, piston and piston-rod for operating the same, supports for said cylinder, a bracket traveling with the piston-rod whereby to prevent the depression of the shoe and rod by the friction of the wheel and supports on which the said bracket travels substantially as set forth.

7. In a brake apparatus an operating-valve comprising a casing having the air-passage and vent, the independent valves controlling said passage and vent, means for positively operating said valves independently, and the brake-shoe, pressure-reservoir and connecting devices substantially as set forth.

8. In an apparatus substantially as described, the operating-valve comprising the casing having the air-passage and vent, the plug-valves controlling said passage and vent, and the levers operating side by side and meshed with their respective plug-valves substantially as set forth.

9. In an apparatus substantially as described, the combination of the pressure-reservoir, the brake-shoe and its operating means, the pipe connections between the reservoir and the brake-operating devices, the controlling-valves, a vent-valve between the brake-shoe-operating devices and the controlling-valve, and means for positively operating said valves independently.

WILLIAM JOHN DONALDSON, Jr.

Witnesses:
NIMON E. BAKER,
H. M. VERMILLION.